UNITED STATES PATENT OFFICE.

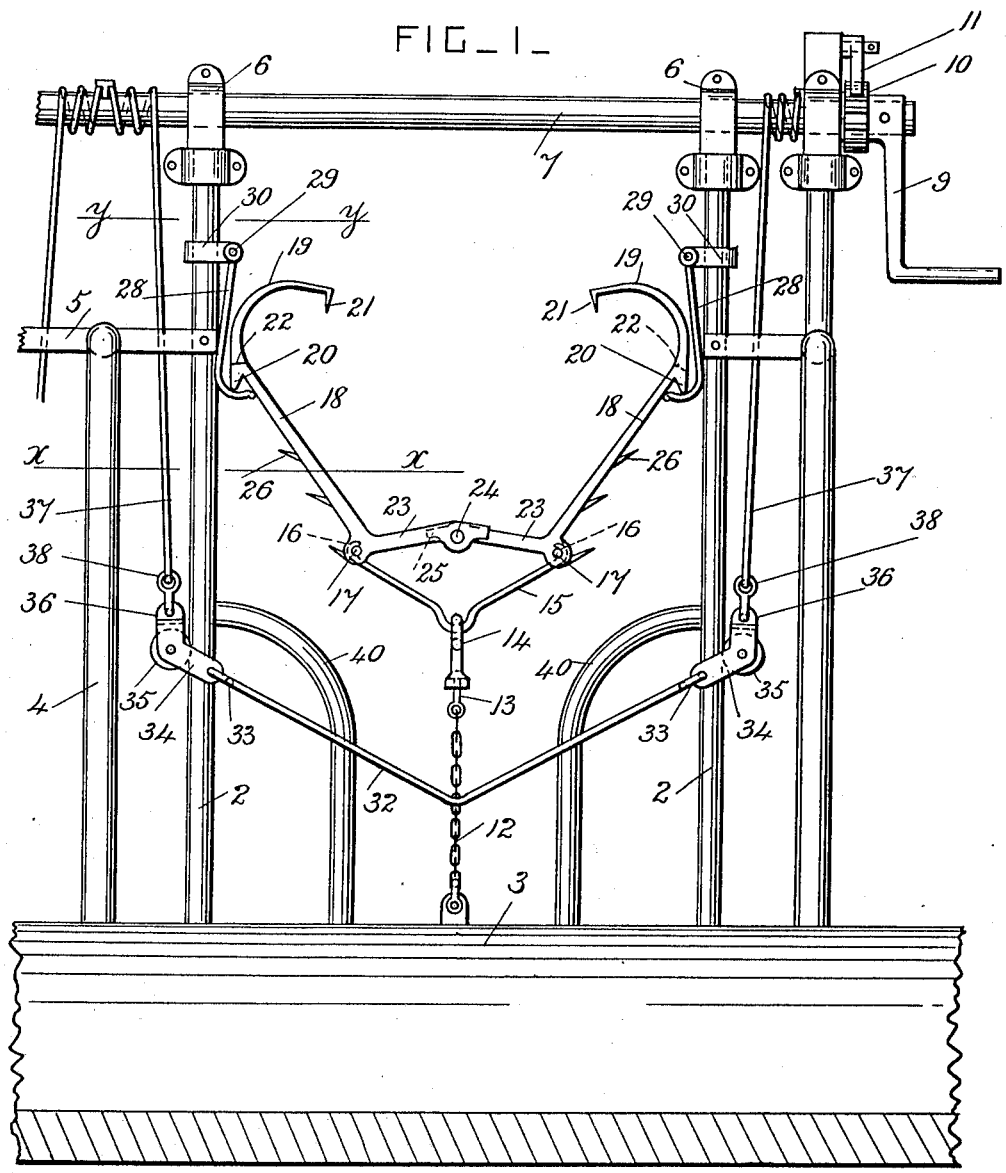

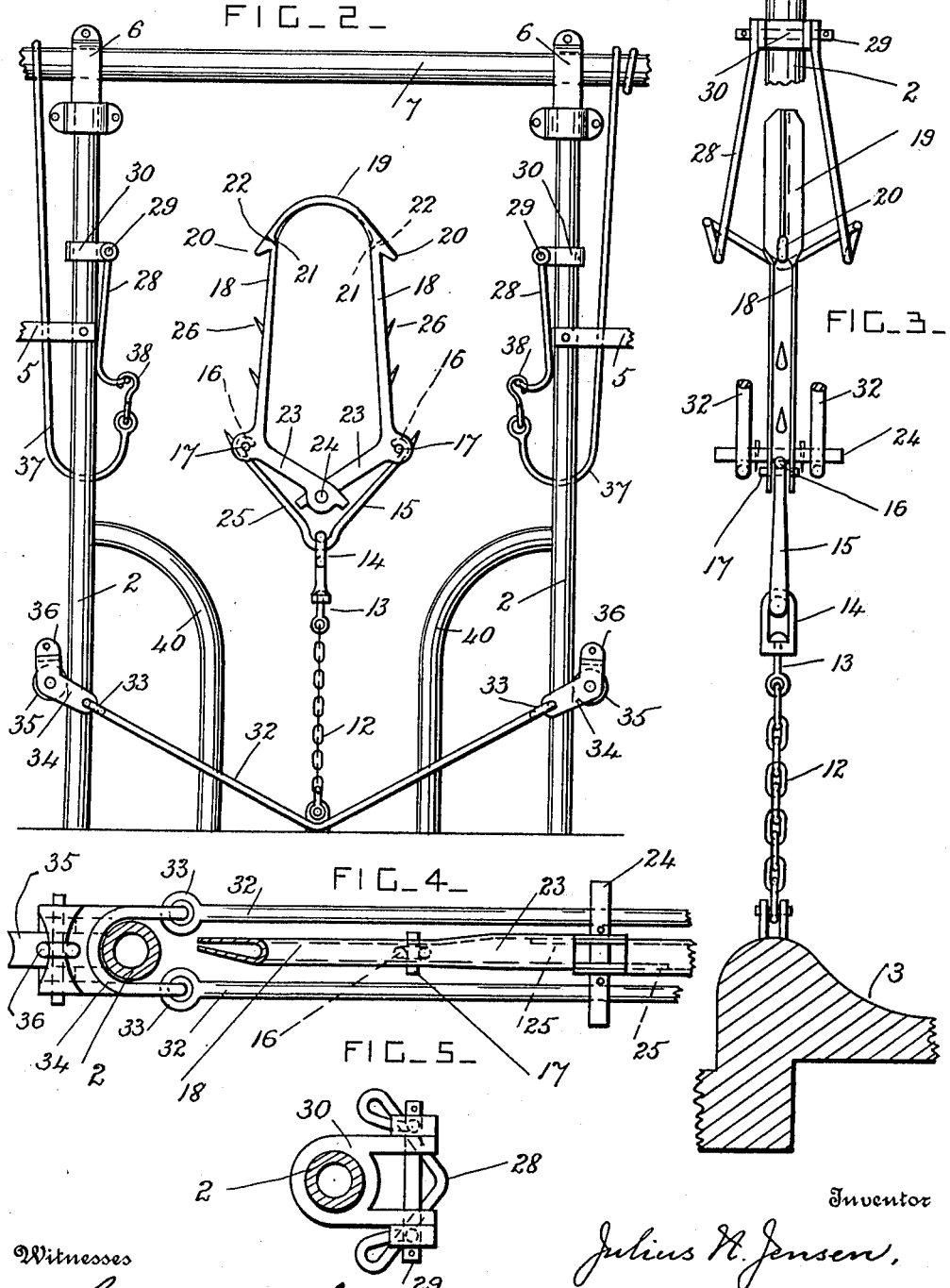

JULIUS N. JENSEN, OF LINCOLN, NEBRASKA.

STANCHION.

1,040,950.

Specification of Letters Patent.

Patented Oct. 8, 1912.

Application filed August 30, 1911. Serial No. 646,861.

*To all whom it may concern:*

Be it known that I, JULIUS N. JENSEN, a subject of the Emperor of Germany, residing at Lincoln, in the county of Lancaster and State of Nebraska, have invented certain new and useful Improvements in Stanchions; and I do hereby declare the following to be a full, clear, and exact description of the invention, such as will enable others skilled in the art to which it appertains to make and use the same.

This invention relates to stanchions for holding cattle in stalls; and it consists in the novel construction and combination of the parts hereinafter fully described and claimed whereby the neck-yoke is closed automatically upon the neck of the animal and whereby the animal may be released therefrom at will and from a distance.

In the drawings, Figure 1 is a front view of a stanchion constructed according to this invention, showing the neck-yoke open and ready to engage with the animal. Fig. 2 is a front view of the same or a similar stanchion, showing the neck-yoke closed, and the setting-bars fully depressed and also disconnected from their operating cords. Fig. 3 is an end view of portions of a neck-yoke and the setting-bars, drawn to a larger scale, and showing a portion of the manger in section with the neck-yoke connected to it. Fig. 4 is a plan view of portions of the neck-yoke and setting-bars, showing a guide-post in section on the line *x—x* in Fig. 1. Fig. 5 is a plan view of one of the suspension links, showing a guide-post in section on the line *y—y* in Fig. 1.

A supporting frame of any approved construction is provided, and in the example shown this frame is provided with guide-posts 2 arranged one on each side of the stanchion and in front of the manger 3 wherein food is placed to attract the animal. The stanchions are arranged side by side in a row, but only one complete stanchion is shown, as they are all alike. Supporting posts 4 and crosspieces 5 are provided between the guide-posts of the adjacent stanchions.

The upper end portions of the guide-posts 2 are provided with bearings 6, and 7 is an operating shaft journaled in the bearings and extending the full length of the row of stanchions. A crank-handle 9, or other operating device, is secured to the shaft 7 for revolving it. A toothed wheel 10 is also secured to the shaft 7, and 11 is a pawl which engages with the toothed wheel 10, and which prevents the shaft from revolving backward when not required. The lower portions of the guide-posts 2 have curved guard-rails 40 secured to them to prevent the animals from getting between the guide-posts and the stanchion chains.

Each stanchion is connected to the middle part of the frame or manger by a flexible chain or other similar connection 12, and the upper end of the chain is provided with a swivel 13 and an eye 14. A spring clevis 15 is provided, and its middle part is placed in engagement with the eye 14. This clevis is formed of spring steel, and the free ends of its arms are provided with hooks 16 for engaging with pins 17 on the arms of the neck-yoke. The neck-yoke is provided with two arms 18 having hook-shaped upper end portions 19 which overlap each other when the yoke is closed. Each arm has a tooth 20 on its outer side. The tips of the hook-shaped portions 19 are provided with projections 21 which engage with stop lugs 22 on the sides of the arms near the teeth 20 when the neck-yoke is closed, so that the neck-yoke is prevented from pinching the neck of the animal.

The lower parts of the arms 18 have toggle members 23 which are arranged at an angle to the main portions of the arms, and which are pivoted together by a pin 24. The pins 17 which engage with the spring clevis are arranged at the junction of the toggle members with the main portions of the arms, and the toggle members are provided with stops 25 which prevent the arms from being spread farther apart by the spring clevis when the center of the pin 24 is placed a little above the level of the centers of the pins 17 at the other ends of the toggle members. The arms and toggle members are preferably formed of thin sheet steel bent or stamped so as to have a U-shaped cross-section, and the arms are provided with barbs 26 on their outer sides. Suspension links 28 are provided, and are pivoted by pins 29 to collars 30 which are secured to the guide-posts 2. These links have hook-shaped lower end portions and they engage with the teeth 20 on the arms of the neck-yoke, so that the neck-yoke is supported by the links when in its open position, as shown in Fig. 1.

Each stanchion is provided with a pair of setting-bars 32. These bars straddle the stanchion chain 12, and they are bent downwardly at the middle part of their length. The ends of the setting-bars are provided with eyes 33 which engage the holes in crossheads 34 which are slidable upon the guide-posts 2. The crossheads are provided with antifriction rollers 35 which run on the guide-posts, and they have lugs 36 at their upper parts. Cords 37, or other similar flexible connections, are attached to the lugs 36 by hooks 38, and the upper end portions of these cords are wound upon and secured to the shaft 7.

All the neck-yokes may be opened and set simultaneously, but if desired to retain an animal the appropriate hooks 38 are disengaged from the lugs 36, and may conveniently be hooked into the links 28, as shown in Fig. 2. In order to open the neck-yoke and set the toggles, the shaft 7 is revolved so as to raise the setting-bars into engagement with the projecting end portions of the pivot pin 24. This pin is raised, against the tension of the spring clevis, until it is above the level of the pins 17, and the teeth 20 then engage automatically with the links 28. The setting-bars are then lowered to any convenient position. The neck-yoke is normally supported by the suspension links, and its arms are held apart by the toggles. The barbs 26 on the arms, and the guard-rails 40, prevent the animal from having access to the food in the manger without putting its head into the neck-yoke. The animal is careful not to knock its nose against the toggles, but when it reaches over them and tries to seize the food, its neck presses down the toggles, and the spring clevis closes the neck-yoke so that the animal cannot get away.

The animals may all be released simultaneously by the setting-bars, or any number of them may be released, or any animal may be released by itself by opening its neck-yoke by hand. The swivel in the stanchion chain permits the animal to have all the freedom of movement which is desirable for it.

The projections or barbs 21 on the tips of the arms 18 are sharp and they are arranged to project downwardly. They are provided so that when an animal is restless and tries to force the arms apart, the barbs 21 will prick the back of its neck and will cause it to desist. The barbs 26 are also useful in preventing a second animal from trying to crowd in between the stanchions when a small animal has its neck engaged by a neck yoke.

What I claim is:

1. In a stanchion, the combination, with a frame, of a pair of arms provided with hook-shaped upper end portions and having also toggle members at their lower parts which are pivoted together at their adjacent ends, supports which suspend the arms from the top of the frame when open, a spring for closing the arms when the toggle members are depressed, and a tether for holding the closed arms.

2. In a stanchion, the combination, with a frame, of a pair of arms provided with hook-shaped upper end portions and having also toggle members at their lower parts which are pivoted together at their adjacent ends, supports which suspend the arms from the top of the frame when open, a spring clevis arranged below the toggle members and connected to their outer ends and operating to close the arms when the toggle members are depressed, and a connection attached to the clevis for holding the closed arms.

3. In a stanchion, the combination, with a frame, of a neck-yoke provided with pivoted arms and having also toggle members and a spring for normally holding the arms apart, a flexible connection arranged between the spring and the frame, a pair of setting-bars which straddle the said connection, and means for raising the setting-bars into engagement with the pivot of the toggle members.

4. In a stanchion, the combination, with a frame provided with guide-posts, of a neck-yoke provided with pivoted arms and having also toggle members and a spring for normally holding the arms apart, a flexible connection arranged between the spring and the frame, a pair of setting-bars which straddle the said connection, crossheads connected to the ends of the setting-bars and sliding on the guide-posts, and means for raising the setting-bars into engagement with the pivot of the toggle members.

5. In a stanchion, the combination, with a frame provided with guide-posts having bearings at their upper parts, and an operating shaft journaled in the said bearings and provided with means for revolving it; of a neck-yoke provided with pivoted arms and having also toggle members and a spring for normally holding the arms apart, a flexible connection arranged between the spring and the frame, a pair of setting-bars which straddle the said connection, crossheads connected to the ends of the setting-bars and sliding on the guide-posts, and flexible connections attached to the crossheads and adapted to be wound upon the operating shaft to raise the setting-bars into engagement with the pivot of the toggle members.

6. In a stanchion, the combination, with a frame, of a pair of arms having hook-shaped upper end portions and stops, each end portion being adapted to overlap the other with its end in contact with the stop on the other end portion, said arms having also toggle members at their lower parts which are pivoted together at their adjacent ends and provided with stops for holding the arms at a prearranged distance apart, supports which suspend the arms from the top of the frame when open, a spring for closing the arms when the toggle members are depressed, and a tether for holding the closed arms.

7. In a stanchion, the combination, with a frame, of a pair of arms provided with hook-shaped upper end portions terminating in downwardly projecting barbs and having also toggle members at their lower parts which are pivoted together at their adjacent ends, supports which suspend the arms from the top of the frame when open, a spring for closing the arms when the toggle members are depressed, and a tether for holding the closed arms.

In testimony whereof I have affixed my signature in the presence of two witnesses.

JULIUS N. JENSEN.

Witnesses:
CLYDE VOSBURGH,
B. McDONALD.

Copies of this patent may be obtained for five cents each, by addressing the "Commissioner of Patents, Washington, D. C."